United States Patent
Huh et al.

(10) Patent No.: US 10,479,361 B2
(45) Date of Patent: Nov. 19, 2019

(54) APPARATUS AND METHOD FOR CONTROLLING BRAKING OF VEHICLE

(71) Applicants: Hyundai Motor Company, Seoul (KR); Kia Motors Corporation, Seoul (KR)

(72) Inventors: Jeewook Huh, Gyeonggi-do (KR); Kyoungcheol Oh, Gyeonggi-do (KR); Teh Hwan Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 211 days.

(21) Appl. No.: 15/632,573

(22) Filed: Jun. 26, 2017

(65) Prior Publication Data

US 2018/0215385 A1    Aug. 2, 2018

(30) Foreign Application Priority Data

Jan. 31, 2017  (KR) .......................... 10-2017-0013461

(51) Int. Cl.
*B60W 30/18*     (2012.01)
*B60K 6/48*      (2007.10)
(Continued)

(52) U.S. Cl.
CPC ....... *B60W 30/18127* (2013.01); *B60K 6/387* (2013.01); *B60K 6/48* (2013.01);
(Continued)

(58) Field of Classification Search
USPC ......................................................... 701/70
See application file for complete search history.

(56) References Cited

U.S. PATENT DOCUMENTS

| 2009/0112432 | A1* | 4/2009 | Ueoka | ..................... | B60T 7/122 701/70 |
| 2010/0076637 | A1* | 3/2010 | Ueoka | ..................... | B60T 7/042 701/22 |
| 2012/0245773 | A1* | 9/2012 | Suzuki | ..................... | B60L 15/20 701/22 |
| 2013/0288855 | A1* | 10/2013 | Monsere | ............. | B60L 15/2045 477/24 |

(Continued)

FOREIGN PATENT DOCUMENTS

| JP | 2007186045 A | 7/2007 |
| JP | 2009189217 A | 8/2009 |
| JP | 2016096633 A | 5/2016 |

*Primary Examiner* — Tyler D Paige
(74) *Attorney, Agent, or Firm* — Mintz Levin Cohn Ferris Glovsky and Popeo, P.C.; Peter F. Corless (57) ABSTRACT

An apparatus and method of controlling a braking force of a vehicle can improve fuel efficiency by increasing the rate of regenerative braking in the vehicle. The method includes: determining a required deceleration based on a running state of other vehicle ahead; determining a maximum value of a maximum creep torque of a motor and a maximum creep torque of a battery as an amount of available creep torque; determining a smaller value of a required deceleration and the amount of available creep torque as the creep torque; determining a motor torque based on the creep torque; performing regenerative braking by controlling the motor so as to follow the determined motor torque; calculating a deceleration torque based on the creep torque and calculating an amount of hydraulic braking based on the deceleration torque; and performing hydraulic braking according to the calculated hydraulic braking amount.

13 Claims, 5 Drawing Sheets

(51) Int. Cl.
*B60W 40/107* (2012.01)
*B60K 6/387* (2007.10)
*B60W 10/08* (2006.01)
*B60W 10/184* (2012.01)
*B60W 30/16* (2012.01)
*B60W 20/10* (2016.01)

(52) U.S. Cl.
CPC .......... *B60W 10/08* (2013.01); *B60W 10/184* (2013.01); *B60W 20/10* (2013.01); *B60W 30/16* (2013.01); *B60W 40/107* (2013.01); *B60K 2006/4825* (2013.01); *B60W 2550/30* (2013.01); *B60W 2710/083* (2013.01); *B60W 2710/18* (2013.01)

(56) References Cited

U.S. PATENT DOCUMENTS

| | | | |
|---|---|---|---|
| 2014/0058640 A1* | 2/2014 | Saito | B60K 6/445 701/70 |
| 2014/0277989 A1* | 9/2014 | Krueger | B60W 10/184 701/96 |
| 2014/0309898 A1* | 10/2014 | Kitazawa | F16D 48/08 701/67 |
| 2015/0266478 A1* | 9/2015 | Takahashi | B60W 30/18063 701/22 |
| 2015/0298690 A1* | 10/2015 | Onouchi | B60L 50/16 701/22 |
| 2015/0307099 A1* | 10/2015 | Dextreit | B60W 50/085 701/22 |
| 2017/0113700 A1* | 4/2017 | Kaneko | B60W 50/06 |
| 2017/0291506 A1* | 10/2017 | Yim | B60L 15/2063 |
| 2018/0215385 A1* | 8/2018 | Huh | B60W 30/18127 |

* cited by examiner

APPARATUS AND METHOD FOR CONTROLLING BRAKING OF VEHICLE

CROSS-REFERENCE TO RELATED APPLICATION

This application claims under 35 U.S.C. § 119(a) the benefit of Korean Patent Application No. 10-2017-0013461, filed on Jan. 31, 2017 in the Korean Intellectual Property Office, the entire contents of which are incorporated by reference herein.

BACKGROUND

1. Technical Field

The present disclosure relates to a method and apparatus for controlling braking of a hybrid vehicle having both an engine and a motor.

2. Description of the Related Art

Eco-friendly vehicles (e.g. hybrid vehicles or electric vehicles) typically use the power of a motor and/or an engine.

When the driver frequently steps on the brakes depending on the road conditions while driving of an eco-friendly vehicle, acceleration/deceleration of the vehicle may frequently occur. Frequent acceleration/deceleration of the vehicle may increase hydraulic pressure consumption, resulting in a decrease in fuel efficiency.

In addition, in the eco-friendly vehicle equipped with a Smart Cruise Control (SCC) system, a hydraulic braking region is enlarged, which may cause a regenerative braking region of the motor to be reduced and fuel efficiency to be lowered.

Figure 5:
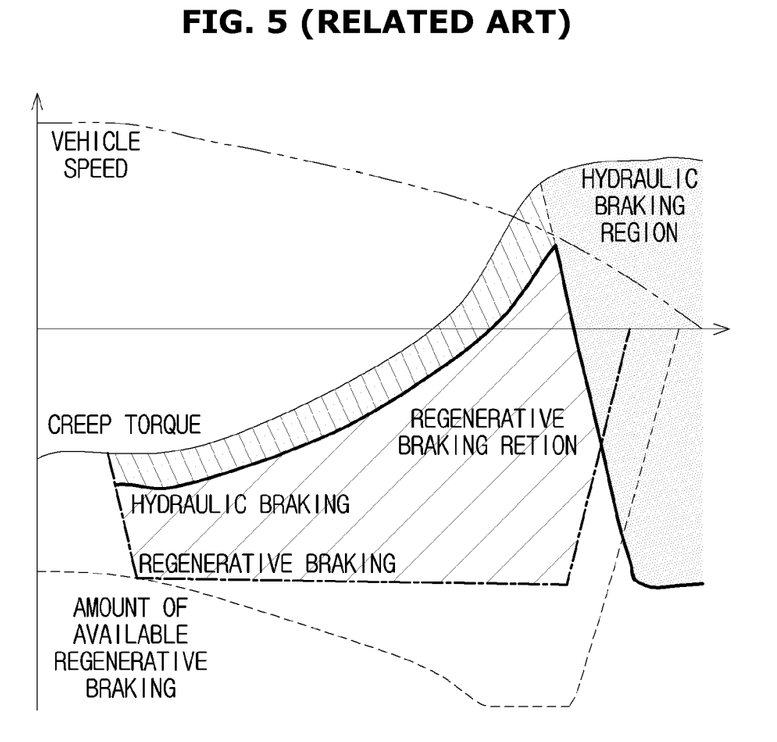
FIG. 5 (RELATED ART) is a schematic diagram illustrating a loss of regenerative braking due to hydraulic braking in a conventional eco-friendly vehicle, resulting in a reduction in fuel efficiency.

FIG. 5 (RELATED ART) is a schematic diagram illustrating a loss of regenerative braking due to hydraulic braking in a conventional eco-friendly vehicle, which results in a reduction in fuel efficiency. As shown in FIG. 5, in the section where the hydraulic braking region and the regenerative braking region overlap, the hydraulic braking region encroaches on a part of the regenerative braking region (fuel efficiency loss region). Fuel efficiency of a conventional vehicle is reduced by the same amount as the encroachment area.

In the SCC mode, the existing braking control prefills the hydraulic pressure of the hydraulic braking device to a predetermined level in consideration of the distance and the relative speed between the vehicle and other vehicle, so that actual braking control is performed more quickly. In ideal prefill conditions, the brake discs and brake pads should be kept very close together without contact. However, in actual prefill conditions, the brake discs and the brake pads may come in contact with each other slightly. This causes unintentional hydraulic braking in the actual prefill, which results in a fuel efficiency loss area, as shown in FIG. 5, due to the hydraulic braking.

SUMMARY

The present disclosure can improve the fuel efficiency by increasing the rate of regenerative braking in an eco-friendly vehicle.

In accordance with the present disclosure, a method for controlling braking of a vehicle, includes: determining a required deceleration based on a running state of other vehicle ahead; determining a maximum value of a maximum creep torque of a motor and a maximum creep torque of a battery as an amount of available creep torque; determining a smaller value of a required deceleration and the amount of available creep torque as the creep torque; determining a motor torque based on the creep torque; performing regenerative braking by controlling the motor so as to follow the determined motor torque; calculating a deceleration torque based on the creep torque and calculating an amount of hydraulic braking based on the deceleration torque; and performing hydraulic braking according to the calculated hydraulic braking amount.

The amount of available creep torque is obtained by the following equations (1) to (3).

Maximum creep torque of the motor=(maximum charge torque)*(motor efficiency)*(gear ratio)*(drive system efficiency) <Equation 1>

Maximum charge torque of the battery=(Maximum charge power)*(battery efficiency)/(motor speed)*(motor efficiency)*(gear ratio)*(drive system efficiency) <Equation 2>

Amount of available creep torque=MAX (maximum creep torque of motor, maximum creep torque of battery) <Equation 3>

The motor torque is obtained by the following equation (5).

Motor torque=(creep torque)/(gear ratio*drive system efficiency motor efficiency) <Equation 5>

The motor torque is obtained by the following equation (6).

Deceleration torque=(motor torque)*(motor efficiency)*(gear ratio)*(drive system efficiency) <Equation 6>

The hydraulic braking amount is obtained by the following equation (7).

Amount of hydraulic braking amount=(required deceleration)−(deceleration torque) <Equation 7>

The required deceleration is determined based on a relative speed and distance to the other vehicle.

In accordance with another aspect of the present disclosure, a method for controlling braking of a vehicle, includes: determining a required deceleration based on a running state of other vehicle ahead; determining a maximum value of a maximum creep torque of a motor and a maximum creep torque of a battery as an amount of available creep torque; determining a smaller value of a required deceleration and the amount of available creep torque as the creep torque; determining a motor torque based on the creep torque; and performing regenerative braking by controlling the motor so as to follow the determined motor torque.

The amount of available creep torque is obtained by following equations (1) to (3).

Maximum creep torque of the motor=(maximum charge torque)*(motor efficiency)*(gear ratio)*(drive system efficiency) <Equation 1>

Maximum charge torque of the battery=(Maximum charge power)*(battery efficiency)/(motor speed)*(motor efficiency)*(gear ratio)*(drive system efficiency) <Equation 2>

Amount of available creep torque=MAX (maximum creep torque of motor, maximum creep torque of battery) <Equation 3>

The motor torque is obtained by the following equation (5).

Motor torque=(creep torque)/(gear ratio*drive system efficiency*motor efficiency) <Equation 5>

The motor torque is obtained by the following equation (6).

Deceleration torque=(motor torque)*(motor efficiency)*(gear ratio)*(drive system efficiency) <Equation 6>

The required deceleration is determined based on a relative speed and distance with the other vehicle.

In accordance with another aspect of the present disclosure, an apparatus for controlling braking of a vehicle, includes: a sensor to determine a required deceleration based on a running state of other vehicle ahead; a first controller to determine a maximum value of a maximum creep torque of a motor and a maximum creep torque of a battery as an amount of available creep torque, to determine a smaller value of a required deceleration and the amount of available creep torque as the creep torque, and to determine a motor based on the creep torque; a second controller to perform regenerative braking by controlling the motor so as to follow the determined motor torque; a third controller to calculate a deceleration torque based on the creep torque, to calculate an amount of hydraulic braking based on the deceleration torque, and to perform hydraulic braking according to the calculated hydraulic braking amount.

In accordance with another aspect of the present disclosure, an apparatus for controlling braking of a vehicle, includes: a sensor to determine a required deceleration based on a running state of other vehicle ahead; a first controller to determine a maximum value of a maximum creep torque of a motor and a maximum creep torque of a battery as an amount of available creep torque, to determine a smaller value of a required deceleration and the amount of available creep torque as the creep torque, and to determine a motor torque based on the creep torque; and a second controller to perform regenerative braking by controlling the motor so as to follow the determined motor torque.

An aspect of the present disclosure is to increase the rate of regenerative braking in an eco-friendly vehicle. This allows improve the fuel efficiency of the eco-friendly vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the description of the present disclosure, drawings and embodiments shown in the drawings are preferred examples of the disclosed invention, and there can be various modifications that can replace the embodiments and the drawings of the present disclosure at the time of filing of the present disclosure.

In addition, the same reference numerals or the same symbols used in the drawings of the present disclosure indicate elements that perform substantially the same function.

Reference will now be made in detail to the exemplary embodiments of the present disclosure, examples of which are illustrated in the accompanying drawings, wherein like reference numerals refer to like elements throughout.

Figure 1:
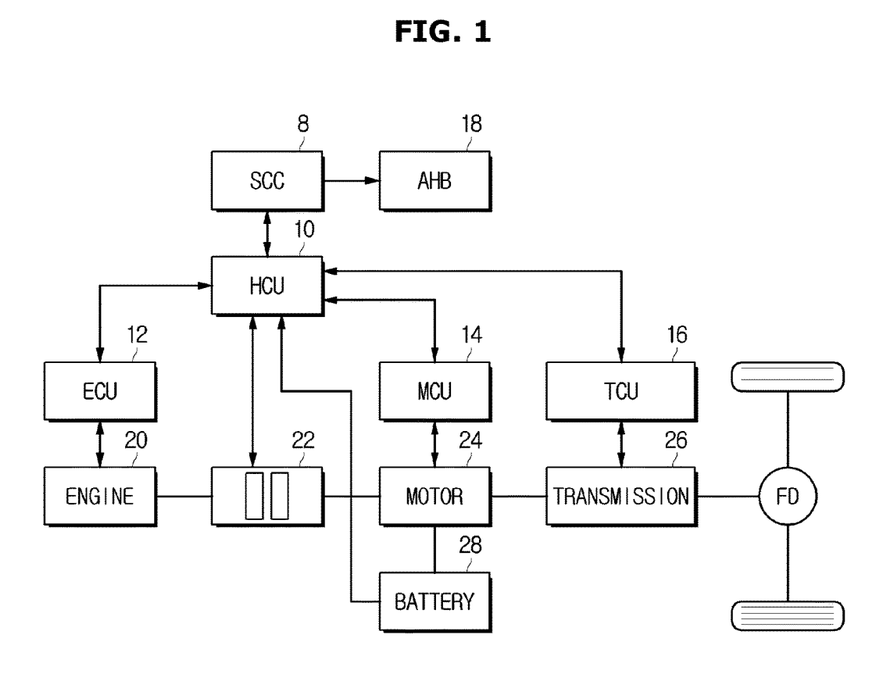
FIG. 1 is a schematic block diagram illustrating a power system and a control system of a hybrid vehicle according to an embodiment of the present disclosure.

FIG. 1 is a schematic block diagram illustrating a power system and a control system of a hybrid vehicle according to an embodiment of the present disclosure. As shown in FIG. 1, the power system and the control system of the hybrid vehicle according to the embodiment of the present disclosure may include a Smart Cruise Control System (SCC) 8, a Hybrid Control Unit (HCU) 10, an Engine Control Unit (ECU) 12, a Motor Control Unit (MCU) 14, a Transmission Control Unit (TCU) 16, an Active Hybrid Booster (AHB) 18, an engine 20, an engine clutch 22, a motor 24, a transmission 26, and a battery 28.

The SCC 8 automatically maintains a distance with an obstacle ahead (for example, other vehicle being driven ahead) using a radar on a front of the hybrid vehicle, which is a sensor mounted on the hybrid vehicle. In other words, the vehicle automatically travels at the speed set by the driver without operations of an accelerator pedal and a brake pedal by a driver, and automatically maintains the distance from the vehicle ahead using the radar.

The HCU (Hybrid Control Unit) 10 is a main controller for controlling overall operation of the hybrid vehicle. The HCU 10 integrally manages the control action of the other controllers. In particular, the HCU 10 connects each controller with a high-speed Control Area Network (CAN) communication line, so as to permit exchange of information with each other. The HCU 10 performs cooperative control to control the output torque of the engine 20 and the motor 24 by the integral management.

The ECU 12 controls the overall operation of the engine 20. The MCU 14 controls overall operation of the motor 24. The TCU 16 controls the overall operation of the transmission 26.

The AHB 18 performs braking of the hybrid vehicle by electronically controlling the master cylinder and the wheel cylinder in response to the driver's operation of the brake pedal.

The engine 20 is a power source for providing power for moving the hybrid vehicle. The engine 20 outputs power in the ignition-on state.

The engine clutch 22 is disposed between the engine 20 and the motor 24. The engine clutch 22 receives a control signal from the HCU 10 and selectively connects either the engine 20 or the motor 24 to the transmission 26 in accordance with the traveling mode of the hybrid vehicle.

The motor 24 is driven by the three-phase AC power applied from the battery 30 through the inverter to generate torque. The motor 24 operates as a generator to generate regenerative energy in the case of inertial driving. The regenerative energy generated by the motor 24 is used to charge the battery 30.

The output torque of either the engine 20 or the motor 24 selected according to the engagement and disengagement of the engine clutch 22 is supplied to the transmission 26 as an input torque. An arbitrary gear position of the transmission 26 is selected according to the speed and the driving condition of the hybrid vehicle, and the driving force is transmitted to the driving wheel, whereby the driving state of the hybrid vehicle is maintained.

The battery 28 is composed of a plurality of unit cells. The battery 28 stores energy (for example, a voltage of 400 V to 450 V of direct current) for driving the motor 24.

Figure 2:
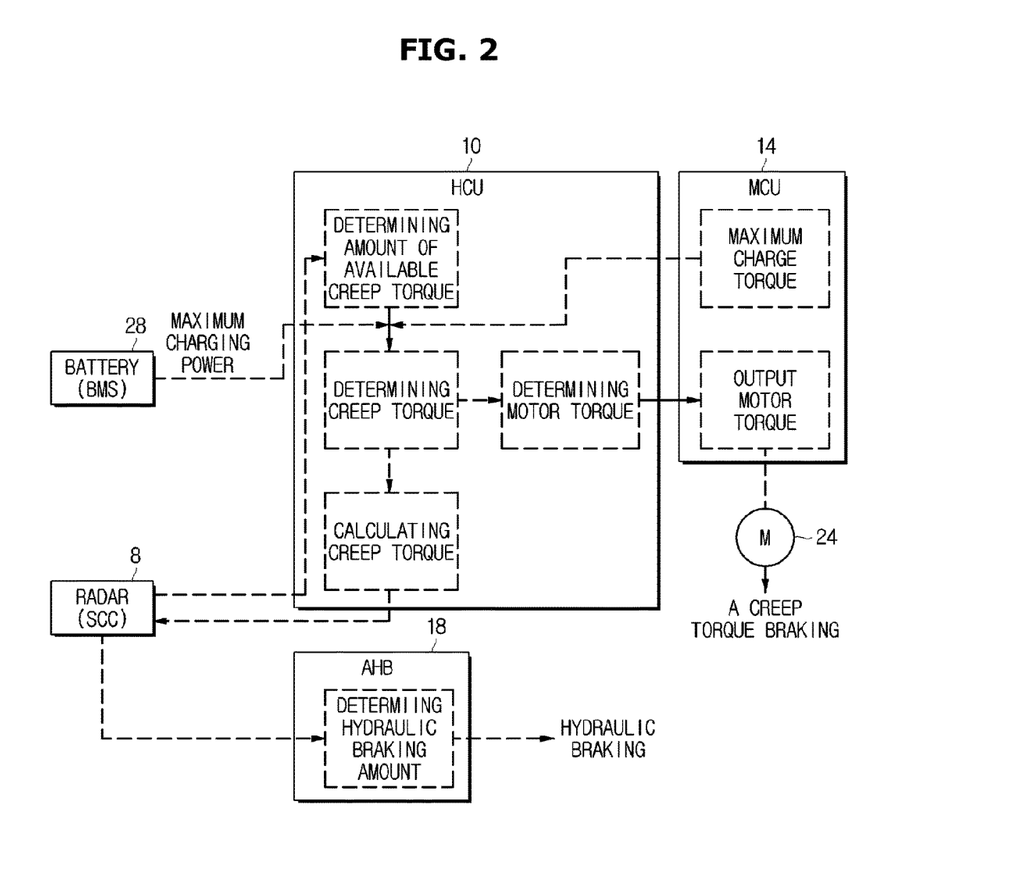
FIG. 2 is a block diagram illustrating generation of a braking force for improving fuel efficiency in the hybrid vehicle according to an embodiment of the present invention.

FIG. 2 is a block diagram illustrating generation of a braking force for improving fuel efficiency in the hybrid vehicle according to an embodiment of the present disclosure.

The SCC 8 determines the required deceleration of the hybrid vehicle based on a relative speed and distance to the obstacle ahead (e.g., other vehicle) using the radar. The SCC 8 determines i) deceleration start distance, ii) distance to reach the speed of other vehicle, iii) the time to reach other vehicle, based on the relative speed and distance to other vehicle. The SCC (8) determines the required deceleration from the three factors i), ii) and iii).

The HCU 10 obtains an amount of available creep torque which is a magnitude of a creep torque (negative torque) that can be generated by the motor 24 from the maximum creep torque of the motor 24 and the battery 28, respectively. The HCU 10 determines a larger value of the maximum creep torque of each of the motor 24 and the battery 28 as the amount of available creep torque. The HCU 10 also determines a smaller value of the required deceleration and the amount of available creep torque as the creep torque.

The HCU 10 also determines the motor torque based on the previously determined creep torque. The motor torque can be expressed as a ratio of the product of the gear ratio, the driving system efficiency, and the motor efficiency, to the creep torque. The value of the motor torque determined at the HCU 10 is transmitted to the MCU 14. The MCU 14 receiving the value of the motor torque controls the motor 24 according to the received value of the motor torque to generate the creep torque. Regenerative braking is performed by the generation of the creep torque.

The HCU 10 calculates the deceleration torque based on the determined creep torque when the SCC mode of the hybrid vehicle is active.

The deceleration torque calculated by the HCU 10 can be expressed as a product of motor torque, motor efficiency, gear ratio, and drive system efficiency.

The SCC 8 generates information of hydraulic braking in consideration of the deceleration torque and provides the information of hydraulic braking to the AHB 18.

The AHB 18 calculates the hydraulic braking amount based on the deceleration torque supplied from the SCC 8. The AHB 18 determines the deceleration as the hydraulic braking amount, except for the deceleration (regenerative braking amount) that can be afforded by the motor torque among the required deceleration (i.e., the required total braking amount). That is, the hydraulic braking amount is determined by subtracting the regenerative braking amount from the required total braking amount.

According to the determined hydraulic braking amount, hydraulic braking is performed through the hydraulic actuator in the brake to follow the required deceleration.

Figure 3:
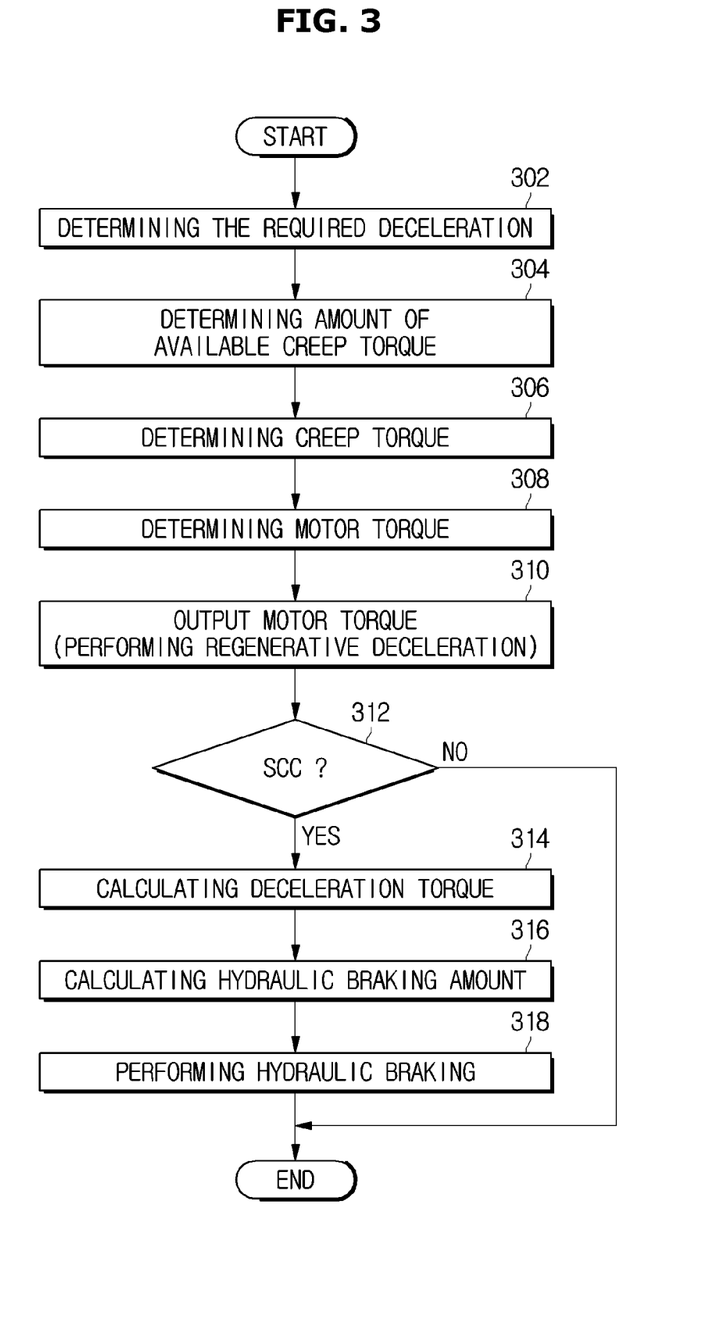
FIG. 3 is a flowchart illustrating a method for controlling braking of a hybrid vehicle according to an embodiment of the present disclosure.

FIG. 3 is a flowchart illustrating a method for controlling braking of a hybrid vehicle according to an embodiment of the present disclosure.

During the driving of the hybrid vehicle according to the embodiment of the present disclosure, the SCC 8 determines the required deceleration of the hybrid vehicle based on the relative speed and distance to the obstacle ahead (e.g., other vehicle) using the radar (302). The SCC 8 determines i) deceleration start distance, ii) distance to reach the speed of other vehicle, iii) the time to reach other vehicle, based on the relative speed and distance to other vehicle. The SCC (8) determines the required deceleration from the three factors i), ii) and iii).

The HCU 10 obtains an amount of available creep torque which is a magnitude of a creep torque (negative torque) that can be generated by the motor 24 from the maximum creep torque of the motor 24 and the battery 28, respectively, by the following equation 1 and equation 2(304).

$$\text{Maximum creep torque of the motor } \mathbf{24} = (\text{maximum charge torque})*(\text{motor efficiency})*(\text{gear ratio})*(\text{drive system efficiency}) \quad \text{<Equation 1>}$$

$$\text{Maximum charge torque of the battery } \mathbf{28} = (\text{Maximum charge power})*(\text{battery efficiency})/(\text{motor speed})*(\text{motor efficiency})*(\text{gear ratio})*(\text{drive system efficiency}) \quad \text{<Equation 2>}$$

Amount of available creep torque=MAX (maximum creep torque of motor, maximum creep torque of battery)  <Equation 3>

The HCU 10 also determines a smaller value of the required deceleration and the amount of available creep torque as the creep torque as shown in equation 4 below (306).

Creep torque=MIN(required deceleration, amount of available creep torque)  <Equation 4>

The HCU 10 determines the motor torque based on the creep torque determined in step 306. The motor torque is determined according to a following equation 5.

Motor torque=(creep torque)/(gear ratio*drive system efficiency*motor efficiency)  <Equation 5>

The motor torque value determined in the step 308 is transmitted to the MCU 14 (310). The MCU 14 receives the value of the motor torque and controls the motor 24 according to the received value of the motor torque to generate the creep torque. Regenerative braking is performed by the generation of the creep torque. The HCU 10 calculates the deceleration torque based on the determined creep torque when the SCC mode of the hybrid vehicle is active. The SCC 8 generates information of hydraulic braking in consideration of the deceleration torque and provides the information of hydraulic braking to the AHB 18. The deceleration torque calculated by the HCU 10 can be expressed by the following equation 6.

Deceleration torque=(motor torque)*(motor efficiency)*(gear ratio)*(drive system efficiency)  <Equation 6>

The AHB 18 calculates the hydraulic braking amount based on the deceleration torque supplied from the SCC 8 (316). The AHB 18 determines the deceleration as the hydraulic braking amount, except for the deceleration (regenerative braking amount) that can be afforded by the motor torque among the required deceleration (i.e., the required total braking amount). That is, the hydraulic braking amount is determined by subtracting the regenerative braking amount from the required total braking amount.

Amount of hydraulic braking amount=(required deceleration)−(deceleration torque)  <Equation 7>

According to the determined hydraulic braking amount, hydraulic braking is performed through the hydraulic actuator in the brake to follow the required deceleration.

Figure 4:
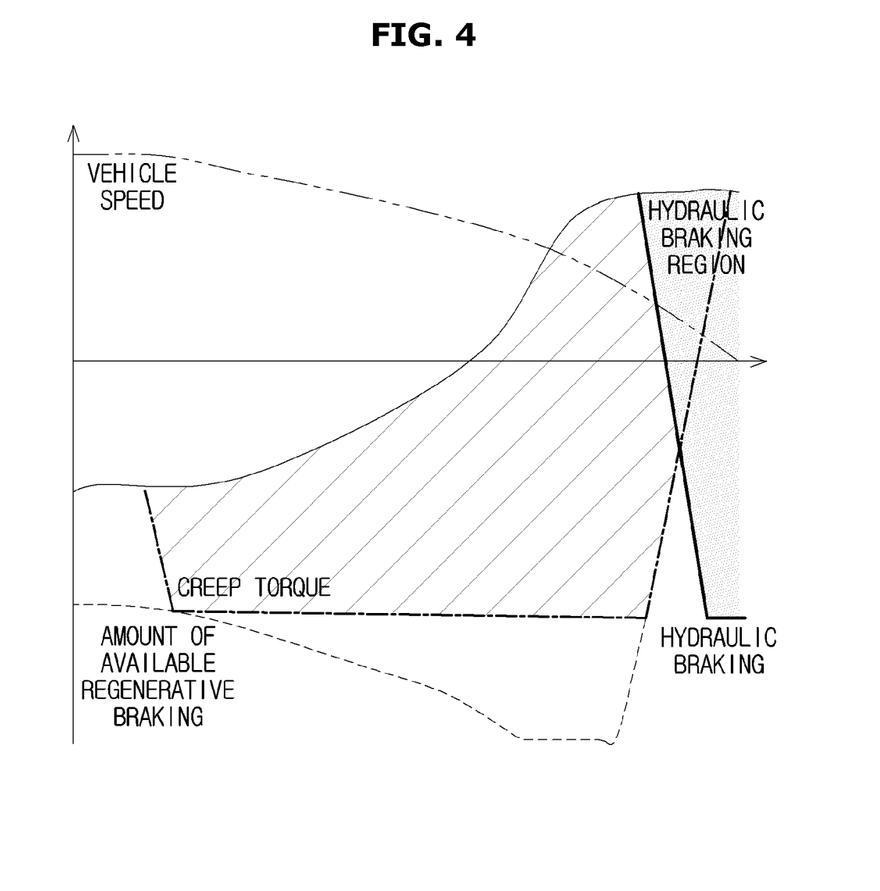
FIG. 4 is a schematic diagram illustrating an effect of a creep torque braking of the hybrid vehicle according to the embodiment of the present disclosure.

FIG. 4 is a schematic diagram illustrating an effect of a creep torque braking of the hybrid vehicle according to the embodiment of the present disclosure.

As shown n FIG. 4, in the hybrid vehicle according to the embodiment of the present invention, the braking by the creep torque is performed first in the entire braking process required for deceleration, and when the braking by the creep torque alone is not sufficient, hydraulic braking is performed additionally to the later part of the entire braking process to ensure the total amount of braking required.

As described above, since there is no interference of the hydraulic braking iii the creep torque sect, there is no decrement in fuel efficiency due to hydraulic braking. That is, the fuel economy of the vehicle according to the embodiment of the present disclosure is improved through braking using the creep torque while ensuring a sufficient braking force as necessary.

It is to be understood that the above description is only illustrative of technical ideas, and various modifications, alterations, and substitutions are possible without departing from the essential characteristics of the present disclosure.

Therefore, the embodiments and the accompanying drawings described above are intended to illustrate and not limit the technical idea, and the scope of technical thought is not limited by these embodiments and accompanying drawings. The scope of which is to be construed in accordance with the following claims, and all technical ideas which are within the scope of the same should be interpreted as being included in the scope of the right.

What is claimed is:

1. A method for controlling braking of a vehicle, comprising:
    determining, by a first controller, a required deceleration based on a running state of other vehicle ahead;
    determining, by the first controller, a maximum value of a maximum creep torque of a motor and a maximum creep torque of a battery as an amount of available creep torque;
    determining, by the first controller, a smaller value of a required deceleration and the amount of available creep torque as the creep torque;
    determining, by the first controller, a motor torque based on the creep torque;
    performing, by a second controller, regenerative braking by controlling the motor so as to follow the determined motor torque;
    calculating, by the first controller, a deceleration torque based on the creep torque and calculating an amount of hydraulic braking based on the deceleration torque; and
    performing, by a third controller, hydraulic braking according to the calculated hydraulic braking amount.

2. The method according to claim 1, wherein the amount of available creep torque is obtained by the following equations (1) to (3);

Maximum creep torque of the motor=(maximum charge torque)*(motor efficiency)*(gear ratio)*(drive system efficiency)  <Equation 1>

Maximum charge torque of the battery=(Maximum charge power)*(battery efficiency)/(motor speed)*(motor efficiency)*(gear ratio)*(drive system efficiency)  <Equation 2>

Amount of available creep torque=MAX (maximum creep torque of motor, maximum creep torque of battery).  <Equation 3>

3. The method according to claim 1, wherein the motor torque is obtained by the following equation (5);

Motor torque=(creep torque)/(gear ratio*drive system efficiency motor efficiency).  <Equation 5>

4. The method according to claim 1, wherein the motor torque is obtained by the following equation (6);

Deceleration torque=(motor torque)*(motor efficiency)*(gear ratio)*(drive system efficiency).  <Equation 6>

5. The method according to claim 1, wherein the hydraulic braking amount is obtained by the following equation (7);

Amount of hydraulic braking amount=(required deceleration)−(deceleration torque)  <Equation 7>

6. The method according to claim 1, wherein the required deceleration is determined based on a relative speed and distance to the other vehicle.

7. A method for controlling braking of a vehicle, comprising:
    determining, by a first controller, a required deceleration based on a running state of other vehicle ahead;

determining, by the first controller, a maximum value of a maximum creep torque of a motor and a maximum creep torque of a battery as an amount of available creep torque;

determining, by the first controller, a smaller value of a required deceleration and the amount of available creep torque as the creep torque;

determining, by the first controller, a motor torque based on the creep torque; and performing, by a second controller, regenerative braking by controlling the motor so as to follow the determined motor torque.

8. The method according to claim 7, wherein calculating the amount of available creep torque according to the following equations (1) to (3);

$$\text{Maximum creep torque of the motor} = (\text{maximum charge torque}) * (\text{motor efficiency}) * (\text{gear ratio}) * (\text{drive system efficiency}) \quad \text{<Equation 1>}$$

$$\text{Maximum charge torque of the battery} = (\text{Maximum charge power}) * (\text{battery efficiency}) / (\text{motor speed}) * (\text{motor efficiency}) * (\text{gear ratio}) * (\text{drive system efficiency}) \quad \text{<Equation 2>}$$

$$\text{Amount of available creep torque} = \text{MAX (maximum creep torque of motor, maximum creep torque of battery)}. \quad \text{Equation 3}$$

9. The method according to claim 7, wherein the motor torque is obtained by the following equation (5);

$$\text{Motor torque} = (\text{creep torque})/(\text{gear ratio} * \text{drive system efficiency motor efficiency}). \quad \text{<Equation 5>}$$

10. The method according to claim 7, wherein the motor torque is obtained by the following equation (6);

$$\text{Deceleration torque} = (\text{motor torque}) * (\text{motor efficiency}) * (\text{gear ratio}) * (\text{drive system efficiency}). \quad \text{<Equation 6>}$$

11. The method according to claim 7, wherein the required deceleration is determined based on a relative speed and distance with the other vehicle.

12. An apparatus for controlling braking of a vehicle, comprising:

a sensor to determine a required deceleration based on a running state of other vehicle ahead;

a first controller to determine a maximum value of a maximum creep torque of a motor and a maximum creep torque of a battery as an amount of available creep torque, to determine a smaller value of a required deceleration and the amount of available creep torque as the creep torque, and to determine a motor based on the creep torque;

a second controller to perform regenerative braking by controlling the motor so as to follow the determined motor torque;

a third controller to calculate a deceleration torque based on the creep torque, to calculate an amount of hydraulic braking based on the deceleration torque, and to perform hydraulic braking according to the calculated hydraulic braking amount.

13. An apparatus for controlling braking of a vehicle, comprising:

a sensor to determine a required deceleration based on a running state of other vehicle ahead;

a first controller to determine a maximum value of a maximum creep torque of a motor and a maximum creep torque of a battery as an amount of available creep torque, to determine a smaller value of a required deceleration and the amount of available creep torque as the creep torque, and to determine a motor torque based on the creep torque; and a second controller to perform regenerative braking by controlling the motor so as to follow the determined motor torque.

* * * * *